July 15, 1941.　　　C. SKOWRON　　　2,249,671
ELECTRIC MOTOR
Filed Dec. 20, 1940　　　3 Sheets-Sheet 2
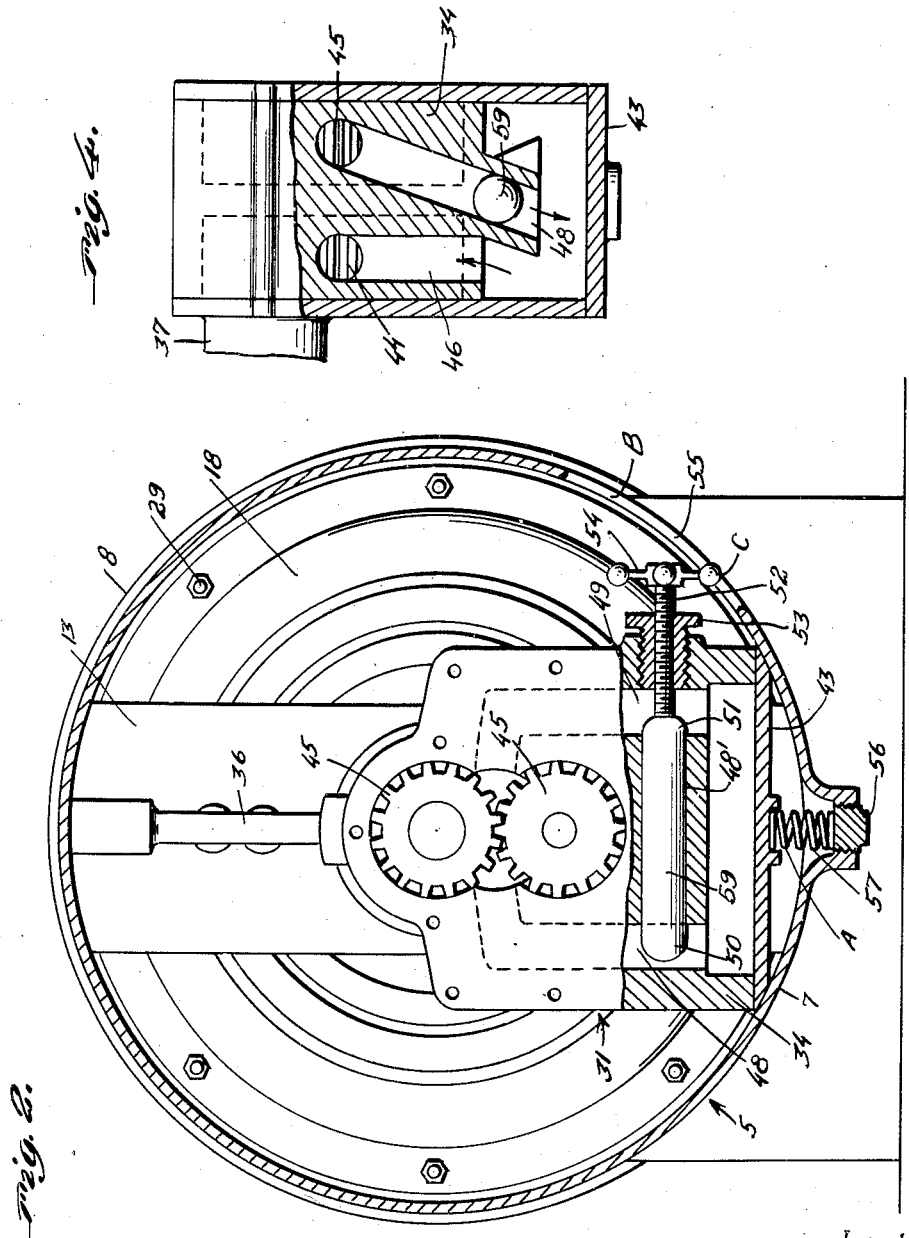
Inventor
Carl Skowron
By Clarence A. O'Brien
Attorney July 15, 1941.　　　C. SKOWRON　　　2,249,671
ELECTRIC MOTOR
Filed Dec. 20, 1940　　　3 Sheets-Sheet 3
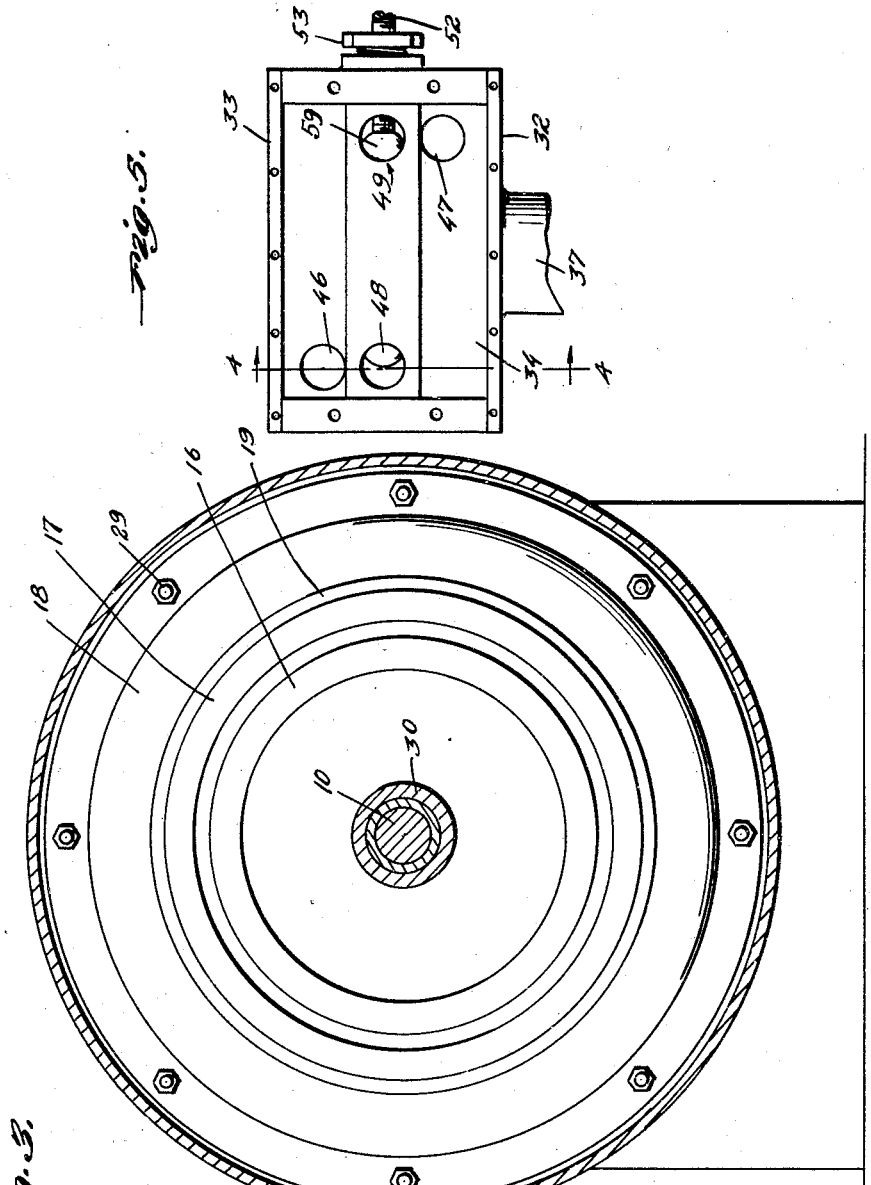
Inventor
Carl Skowron
By　Clarence A. O'Brien
Attorney Patented July 15, 1941

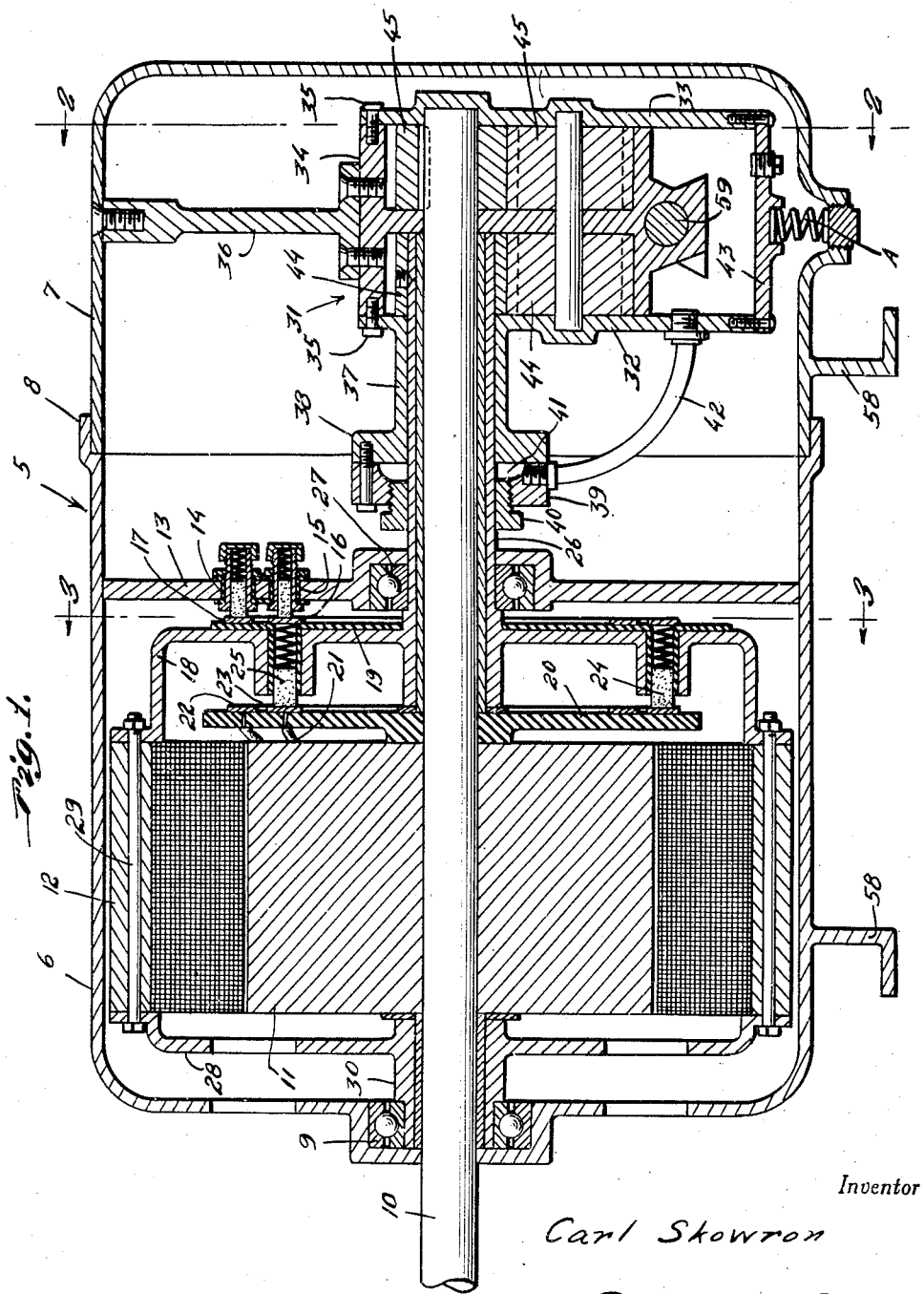

2,249,671

UNITED STATES PATENT OFFICE 2,249,671

ELECTRIC MOTOR

Carl Skowron, Salem, Ohio

Application December 20, 1940, Serial No. 371,025

2 Claims. (Cl. 172—36)

This invention relates to new and useful improvements in electric motors and more particularly to motors wherein both the field and armature are rotatable.

The principal object of the present invention is to provide means whereby a differential or slippage between rotary armatures and fields can be regulated in an accurate and substantially foolproof manner.

Another important object of the invention is to provide a machine of the character stated which while of simple construction, is durable and not apt to develop ready defects.

Other objects and advantages of the invention will become apparent to the reader of the following specification.

In the drawings:

Figure 1 represents a longitudinal sectional view through the machine.

Figure 2 is a cross sectional view on the line 2—2 of Figure 1.

Figure 3 is a cross sectional view on the line 3—3 of Figure 1.

Figure 4 is a fragmentary detailed sectional view through the pump gear assembly, the section being taken on approximately the line 4—4 of Figure 5.

Figure 5 is a fragmentary bottom plan view of the pump gear assembly.

Referring to the drawings wherein like numerals designate like parts, it can be seen that numeral 5 generally refers to an elongated cylindrical housing made up of sections 6 and 7, the section 6 having a skirt portion 8 overlapping the open end of section 7.

A bearing assembly 9 is provided in the closed end of section 6 and through this extends an armature shaft 10. An armature 11 located within the housing 5 is suitably secured to shaft 10 and operates within a field structure 12.

A vertical bridge structure or spider 13 is provided in the housing section 6 and carries brushes 14 and 15 which wipe rings 16 and 17 on cap structure 18, a plate of insulation 19 insulating the rings 16 and 17 from the cap 18.

Numeral 20 denotes a disk of insulation carried by the armature 11 and having connections 21 therethrough to the armature from collector rings 22 and 23 located on the face of the disk 20 opposed to brushes 24 and 25 carried by the cap 18.

The cap 18 is carried by an elongated sleeve 26 through which extends a portion of the armature shaft 10. The sleeve 26 extends through a bearing assembly 27 located in the bridge structure 13. Thus it will be seen that the sleeve 26 forms a hollow shaft and is connected with the field structure to rotate therewith and this hollow shaft surrounds a bearing sleeve which, in turn, surrounds a portion of the shaft 10 connected with the armature, as shown in Figure 1.

At the opposite side of the armature and field assembly from the cap 18, is a second cap 28. The outer edge of this cap 28 and the outer edge of the cap 18 are secured to the outer portion of the field 12 by tie bolts 29. The central portion of the cap 28 has a hub structure 30, a portion of which operates in the aforementioned bearing assembly 9.

The slippage or differential control means for controlling the differential or slippage of rotation between the armature 11 and the field 12 is generally referred to by numeral 31.

This assembly 31 consists of a box-like structure made up of end walls 32 and 33 and a substantially inverted U-shaped shell 34 against which the end walls 32 and 33 are secured by screws 35. This box-like structure is suspended by a leg member 36 depending from the top of the housing section 7. A tubular extension 37 is provided on the end wall 32 and terminates in a head 38 to which a ring 39 is secured and in which a nut 40 is feedable thus defining a chamber 41 in which oil from the box-like structure can enter by way of a tube 42, thus keeping the sleeve 26 thoroughly lubricated.

The box-like structure has a closure plate 43 which is shown removed in Figure 5. The box-like structure is divided into a pair of chambers, one chamber having pump gears 44, 44 therein, one of which is connected with the hollow shaft or sleeve 26 of the field assembly 12, while the other chamber has pump gears 45, 45 therein, one of which is connected with the armature shaft 10. As shown in Figure 5, the two pump units have oil inlets 46 and 47 and oil outlet ducts 48 and 49. The outlet ducts 48 and 49 are in transverse alignment and that portion of the box-like structure between the ducts 48 and 49 is formed with a bore 48' through which is slidable a cylindrical valve element 59 having rounded head portions 50 and 51. From the end portion 51 extends a threaded member 52 feedable through a threaded bushing 53. A hand knob 54 is provided at the outer end of the threaded member 52 and this knob is accessible through an opening 55 in the shell section 7 (see Figure 2).

A plug 56 is provided in the lower portion of the section 7 and upon this rests the coiled compression spring 57 which, in turn, bears against the bottom of the assembly 31 to reduce vibration.

Suitable supporting means 58 can be provided for the housing 5.

It can be seen, that by adjusting the valve 59 to the right or left in Figure 2, the outlet from, for instance, the gears 45, 45 of the armature shaft 10 can be retarded due to the constriction of oil flow while the oil outlet ducts of the other gears 44, 44 will be proportionately open. In other words, there will be a proportionate opening and closing of the two outlet ducts 48 and 49 permitting a regulated differential slippage of motion between the armature 11 and field 12.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. In an electric motor, rotary armature and field units, and means for regulating a slippage between the units, said means consisting of a pair of fluid pump units each consisting of a fluid inlet and a fluid outlet and a common valve element operative into the fluid outlets for uniformly and differentially controlling the outlet of fluid from the gear units.

2. In an electric motor, a rotary armature, a rotary field unit, a shaft connected with the armature, a second shaft connected with the field unit, a pair of fluid pump units, one operated from one shaft and the other from the second shaft, and common valve means for the pair of pump units, said valve means acting to check the operation of one pump unit and increase the action of the other pump unit and vice versa.

CARL SKOWRON.